United States Patent [19]
Shih

[11] Patent Number: 5,824,398
[45] Date of Patent: Oct. 20, 1998

[54] PLASTICIZED POLYESTER FOR SHRINK FILM APPLICATIONS

[75] Inventor: Wayne Ken Shih, Kingsport, Tenn.

[73] Assignee: Eastman Chemical Company, Kingsport, Tenn.

[21] Appl. No.: 792,123

[22] Filed: Jan. 31, 1997

Related U.S. Application Data

[60] Provisional application No. 60/020,317 Jun. 24, 1996.

[51] Int. Cl.$^6$ .............................. B32B 3/00; C08F 283/00; C08G 63/91
[52] U.S. Cl. .......................... 428/211; 528/272; 528/307; 528/308; 528/308.6; 525/437; 525/444.5; 524/127; 524/313; 524/318; 524/605; 264/211; 264/291; 428/119; 428/221; 428/357
[58] Field of Search ..................................... 528/272, 307, 528/308, 308.6; 525/437, 444.5; 524/127, 313, 318, 605; 264/211, 291; 428/119, 221, 357

[56] References Cited

U.S. PATENT DOCUMENTS

| | | | |
|---|---|---|---|
| 4,963,418 | 10/1990 | Isaka et al. | 428/34.9 |
| 4,996,291 | 2/1991 | Yoshinaka et al. | 528/272 |
| 5,534,570 | 7/1996 | Shih et al. | 524/114 |
| 5,589,126 | 12/1996 | Shih et al. | 264/211 |

*Primary Examiner*—Samuel A. Acquah
*Attorney, Agent, or Firm*—Cheryl J. Tubach; Harry J. Gwinnell

[57] ABSTRACT

This invention relates to polyester/plasticizer blends which are useful as heat-shrinkable films or sheets in low temperature shrink packaging applications. The heat-shrinkable films or sheets comprise a blend of (A) 90 to 99 weight percent of a polyester having a glass transition temperature of 40° C. to 150° C. and an inherent viscosity of 0.5 to 1.2 dL/g and (B) 1 to 10 weight percent of a plasticizer selected from a $C_5$ to $C_{35}$ monoglyceride prepared from the reaction of glycerol and a fatty acid having 4 to 30 carbon atoms, wherein the combined weights of (A) and (B) total 100 percent. The polyester comprises a dicarboxylic acid component comprising repeat units from at least 80 mole percent of an aromatic dicarboxylic acid having 8 to 14 carbon atoms and a diol component comprising repeat units from at least 10 mole percent of 1,4-cyclohexanedimethanol, based on 100 mole percent dicarboxylic acid and 100 mole percent diol.

12 Claims, No Drawings

PLASTICIZED POLYESTER FOR SHRINK FILM APPLICATIONS

This application claims the benefit of U.S. Provisional Application No. 60/020,317 filed Jun. 24, 1996.

FIELD OF THE INVENTION

This invention relates to polyester/plasticizer blends which are useful as heat-shrinkable films or sheets, and more particularly as films or sheets in low temperature shrink packaging applications.

BACKGROUND OF THE INVENTION

Heat-shrinkable plastic films are used for labelling, protection, parceling, and wrapping of glass, metal, ceramic and plastic bottles, boxes, cans, pipes, and wood. For example, heat-shrinkable films are widely used as tamper evident labels on food and pharmaceutical products and as primary labels on plastic containers such as soft drink bottles. Shrink films are classified into two categories: (1) biaxially oriented film for wrapping wherein the film shrinks in both the x- and y-axis directions, and (2) uniaxially oriented film wherein the film primarily shrinks in the stretched or oriented direction and has a little shrinkage in the unstretched or nonoriented direction.

The most widely used shrink film is polyvinyl-chloride (PVC), however, shrink films have been prepared from polystyrene (OPS), oriented polyethylene, oriented polypropylene, and polyesters. While PVC has good heat-shrinkable properties, PVC is not suitable for low temperature shrink packaging. In addition, the incineration of PVC generates hydrogen chloride which causes corrosion of the incinerator and environmental pollution.

Examples of heat-shrinkable polyester films are disclosed in U.S. Pat. Nos. 4,996,291 and 4,963,418. U.S. Pat. No. 4,996,291 discloses a heat-shrinkable polyester film prepared from polyethylene terephthalate. While a list of additives is included, plasticizers are not listed. U.S. Pat. No. 4,963,418 discloses a heat-shrinkable polyester film prepared from a polyester, a polyester copolymer, or a mixture of a polyester and a polyester copolymer. No suggestion is made of forming a blend with a plasticizer or any other additive.

Previously disclosed polyester films have at least two major disadvantages, a higher on-set shrink temperature than 50°–60° C. and a higher shrink rate than four percent per degree Celsius. A high on-set shrink temperature means that the film or sheet requires a higher temperature at which the film starts to contract in a heated shrink tunnel or oven. High on-set temperature can cause container or content damage. The other disadvantage is a higher shrink rate which refers to the percent shrinkage per degree of temperature increase. A high shrink rate causes wrinkle or bubble formation in shrink film or sheet as it travels through the shrink tunnel.

In U.S. Pat. No. 5,534,570 the present inventors unexpectedly determined that the on-set shrink temperature and the shrink rate of a heat-shrinkable film or sheet prepared from a polyester could be decreased by melt blending a critical amount of a plasticizer selected from a $C_4$ to $C_{20}$ alkyl ester of an epoxidized fatty acid having 12 to 20 carbon atoms provided the plasticizer had sufficient stability to permit its incorporation into the polyester at a temperature of 200° C. to 300° C. Moreover, the polyester/plasticizer blends produced clear film without the environmental disadvantages associated with other films.

SUMMARY OF THE INVENTION

A heat-shrinkable film comprises a blend of (A) 90 to 99 weight percent of a polyester having a glass transition temperature of 40° C. to 150° C. and an inherent viscosity of 0.5 to 1.2 Dl/g and (B) 1 to 10 weight percent of a plasticizer selected from a $C_5$ to $C_{35}$ monoglyceride prepared from the reaction of glycerol and a fatty acid having 4 to 30 carbon atoms provided the plasticizer has sufficient stability to permit its incorporation into the polyester at a temperature of 200° C. to 300° C., wherein the combined weights of (A) and (B) total 100 percent. The polyester comprises a dicarboxylic acid component comprising repeat units from at least 80 mole percent of an aromatic dicarboxylic acid having 8 to 14 carbon atoms and a diol component comprising repeat units from at least 10 mole percent of 1,4-cyclohexanedimethanol, based on 100 mole percent dicarboxylic acid and 100 mole percent diol.

DESCRIPTION OF THE INVENTION

The polyester, component (A), of the present invention includes copolyesters. The polyester may be semi-crystalline or amorphous, preferably amorphous. The polyester contains repeat units from a dicarboxylic acid and a diol, based on 100 mole percent dicarboxylic acid and 100 mole percent diol. The dicarboxylic acid component contains at least 80 mole percent of an aromatic dicarboxylic acid having 8 to 14 carbon atoms. The polyester may optionally be modified with up to 20 mole percent, based on 100 mole percent dicarboxylic acid, of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids are: terephthalic acid, phthalic acid, isophthalic acid, naphthalene-2,6-dicarboxylic acid, cyclohexane-dicarboxylic acid, cyclohexanediacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid".

The diol component contains repeat units from at least 10 mole percent 1,4-cyclohexanedimethanol. In addition, the diol component can optionally be modified with up to 90 mole percent, based on 100 mole percent diol, of one or more different diols other than 1,4-cyclohexanedimethanol. Such additional diols include cycloaliphatic diols having 6 to 15 carbon atoms and aliphatic diols having 3 to 8 carbon atoms. Examples of such diols to be included with 1,4-cyclohexanedimethanol are: ethylene glycol, diethylene glycol, triethylene glycol, propane-1,3-diol, butane-1,4-diol, 2,2-dimethylpropane-1,3-diol (neopentyl glycol), pentane-1,5-diol, hexane-1,6-diol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

For the purposes of the present invention, the preferred polyester, component (A), has a dicarboxylic acid component consisting of repeat units from terephthalic acid and a diol component consisting of repeat units from 65 to 90 mole percent ethylene glycol and 35 to 10 mole percent 1,4-cyclohexanedimethanol. More preferably, the diol portion consists of 67 to 75 mole percent ethylene glycol and 33 to 25 mole percent 1,4-cyclohexanedimethanol.

Polyesters useful as component (A) have an inherent viscosity of 0.5 to 1.2 dL/g. Preferably, the polyester has an inherent viscosity of 0.6 to 0.9 dL/g as measured at 25° C. using 0.50 grams of polymer per 100 ml of a solvent consisting of 60% by weight phenol and 40% by weight tetrachloroethane. Polyesters useful as component (A) also have a glass transition temperature of 40° C. to 150° C., preferably 50° C. to 100° C.

The polyester may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid state polymerization methods.

Component (B) of the present invention is a plasticizer selected from a $C_5$ to $C_{35}$ monoglyceride prepared from the reaction of glycerol and a fatty acid having 4 to 30 carbon atoms. The fatty acids may be linear or branched, saturated or unsaturated, mono- or multi-unsaturated. Some examples of such fatty acids include isovaleric acid, valeric acid, caproic acid, enanthic acid, caprylic acid, pelargonic acid, capric acid, lauric acid, tridecylic acid, myristic acid, pentadecyclic acid, palmitic acid, margaric acid, stearic acid, arachidic acid, phytanic acid, behenic acic, lignoceric acid, cerotic acid, montanic acid, caproleic acid, palmitoleic acid, oleic acid, vaccenic acid, elaidic acid, brassidic acid, erucic acid, nervonic acid, linoleic acid, eleosteric acid, linolenic acid and arachidonic acid. Preferably component (B) is glyceryl monostearate, a plasticizer commercially available under the tradename Myvaplex 600P from Eastman Chemical Company.

The present inventors have unexpectedly discovered that these materials provide heat shrinkable films with lower on-set temperatures and shrink rates similar to the $C_4$ to $C_{20}$ alkyl esters of an epoxidized fatty acid disclosed in U.S. Pat. No. 5,534,570. These plasticizer have sufficient stability to permit its incorporation into the polyester at a temperature of 200° C. to 300° C., preferably, 250° C. to 280° C. The term "sufficient stability" means that these plasticizer should be stable to decomposition and volatility within a temperature range of 200° C. to 300° C.

The process for preparing the polyester/plasticizer blend of the present invention involves first drying the polyester in an atmosphere of dried air or dried nitrogen, or under reduced pressure. Under melt processing conditions the polyester undergoes molecular weight degradation in the presence of contaminants such as water, thus, it is preferable that the polyester be incorporated in anhydrous form into the blends of the present invention.

The plasticizer is mixed with the polyester by any suitable melt blending process such as batch mixing, single screw, or twin screw extrusion. Preferably, the plasticizer is injected into the melt of the polyester using a liquid or solid pumping system. The polyester/plasticizer blends may also be prepared by adding the plasticizer to the polyester late in the polymerization after polymerization is essentially complete. After completion of the melt compounding, the extrudate is withdrawn in strand form, and recovered according to the usual way such as cutting.

The extrudate, prepared above, may be used as a concentrate which is mixed with the polyester, component (A). Methods for mixing the concentrate pellets with the polyester pellets include feeding the concentrate pellets with an additive feeder and mechanically mixing the polyester and concentrate pellets. The polyester/concentrate blends are melt blended, dried and extruded into a film or sheet.

The percentage by weight of the polyester in the polyester/plasticizer blend is 90 to 99%. More preferably, the polyester constitutes 94 to 98 weight percent of the polyester/plasticizer blend. The polyester/plasticizer blends of the present invention have an inherent viscosity of 0.55 dl/g to 1.5 dl/g, preferably 0.70 to 0.80 dl/g as measured at 23° C. using 0.50 grams of polymer per 100 ml of a solvent consisting of 60% by weight phenol and 40% by weight tetrachloroethane.

Many other ingredients can be added to the compositions of the present invention to enhance the performance properties of the blends. For example, denesting agents, anti-blocking agents, stabilizers, antioxidants, ultraviolet light absorbing agents, mold release agents, metal deactivators, colorants such as titanium dioxide and carbon black, granulated silica, kaolin, calcium carbonate, anti-static agents, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

The polyester/plasticizer blends of the present invention serve as excellent starting materials for the production of films of all types especially heat-shrinkable films and sheet. Heat-shrinkable plastic films are used for labelling, protection, parceling, and wrapping of glass, metal, ceramic and plastic bottles, boxes, cans, pipes, and wood. For example, heat-shrinkable films are widely used as tamper evident labels on food and pharmaceutical products, as primary labels on plastic containers such as soft drink bottles, and protective wraps for medicines and dry cell batteries.

The invention will be further illustrated by a consideration of the following examples, which are intended to be exemplary of the invention. All parts and percentages in the examples are on a weight basis unless otherwise stated.

EXAMPLE I

Polyester pellets consisting of 100 mole percent terephthalic acid, 65–70 mole percent ethylene glycol and 30–35 mole percent 1,4-cyclohexanedimethanol with an I.V. of 0.75 was dried at 65° C. for 4 hours in desiccant air with a dew point ≦−29° C. The PETG polyester was placed in the hopper of a single screw extruder and extruded into 5–10 ml sheets at 260° C.

The polyester had an I.V. of 0.73 dl/g and a Tg, as determined by DSC at 20° C./min, of 82° C. The test results of the PETG polyester are summarized in Table I.

EXAMPLE II

Sheet prepared from 99 wt % PETG polyester and 1 wt % glyceryl monostearate.

A polyester/plasticizer concentrate was prepared using 10 weight percent of solid glyceryl monostearate and 90 weight percent of the PETG polyester pellets prepared in Example I. The concentrate pellets were mechanically blended with PETG polyester pellets from Example I in a ratio of 10/90, respectively. The pellets were extruded into a sheet using a single screw extruder.

The final concentration of glyceryl monostearate in the sheet was 1 weight percent. The polymer had a Tg, as determined by DSC at 20° C./min, of 77° C. The test results are summarized in Table I.

EXAMPLE III

Sheet prepared from 98 wt % PETG copolyester and 2 wt % glyceryl monostearate.

A polyester/plasticizer concentrate was prepared using 10 weight percent of solid glyceryl monostearate and 90 weight percent of the PETG polyester pellets prepared in Example I. The concentrate pellets were mechanically blended with PETG polyester pellets from Example I in a ratio of 20/80, respectively. The pellets were extruded into a sheet using a single screw extruder.

The final concentration of glyceryl monostearate in the sheet was 2 weight percent. The polymer had a Tg, as determined by DSC at 20° C./min, of 75° C. The test results are summarized in Table I.

EXAMPLE IV

Sheet prepared from 97 wt % PETG copolyester and 3 wt % glyceryl monostearate.

A polyester/plasticizer concentrate was prepared using 10 weight percent of solid glyceryl monostearate and 90 weight percent of the PETG polyester pellets prepared in Example I. The concentrate pellets were mechanically blended with PETG polyester pellets from Example I in a ratio of 30/70, respectively. The pellets were extruded into a sheet using a single screw extruder.

The final concentration of glyceryl monostearate in the sheet was 3 weight percent. The polymer had a Tg, as determined by DSC at 20° C./min, of 70° C. The test results are summarized in Table I.

EXAMPLE V

Sheet prepared from 96 wt % PETG copolyester and 4 wt % glyceryl monostearate.

A polyester/plasticizer concentrate was prepared using 10 weight percent of solid glyceryl monostearate and 90 weight percent of the PETG polyester pellets prepared in Example I. The concentrate pellets were mechanically blended with PETG polyester pellets from Example I in a ratio of 40/60, respectively. The pellets were extruded into a sheet using a single screw extruder.

The final concentration of glyceryl monostearate in the sheet was 4 weight percent. The polymer had a Tg, as determined by DSC at 20° C./min, of 68° C. The test results are summarized in Table I.

TABLE I

| EXAMPLE | POLYESTER (wt %) | PLASTICIZER (wt %) | Tg (°C.) |
|---|---|---|---|
| I | 100 | 0 | 82° C. |
| II | 99 | 1 | 77° C. |
| III | 98 | 2 | 75° C. |
| IV | 97 | 3 | 70° C. |
| V | 96 | 4 | 68° C. |

The results in Table I clearly show that the glass transition temperature of a heat-shrinkable polyester film can be significantly decreased by melt blending a critical amount of a plasticizer having low volatility at temperatures of less than 300° C. with the polyester.

EXAMPLE VI

PVC sheet was stretched into film at 90° C. with a stretch ratio 3 times in the machine direction (MD) and without any stretch in the transverse direction (TD). In other words, the film was uniaxially oriented. The shrinkage of the oriented film was measured in a constant temperature water bath for 30 seconds. Typical data measured at 60°, 70°, 80°, and 90° C. respectively are illustrated in Table II. The on-set shrink temperature, which is the temperature at which the film shrinks 2%, was about 60° C. The test results for PVC shrinkage are summarized in Table II.

EXAMPLE VII

The PETG polyester prepared in Example I was extruded into sheet then stretched into film at 90° C. with a MD stretch ratio 4 times. The on-set shrink temperature for PETG was about 64° C. The test results for PETG shrinkage are summarized in Table II.

EXAMPLE VIII

The PETG polyester pellets prepared in Example I were melt blended with 1% glyceryl monostearate and extruded into sheet then stretched into film at 90° C. with a MD stretch ratio 4 times. The test results for shrinkage are summarized in Table II.

EXAMPLE IX

The PETG polyester pellets prepared in Example I were melt blended with 2% glyceryl monostearate and extruded into sheet then stretched into film at 90° C. with a MD stretch ratio 4 times. The test results for shrinkage are summarized in Table II.

EXAMPLE X

The PETG polyester pellets prepared in Example I were melt blended with 3% glyceryl monostearate and extruded into sheet then stretched into film at 85° C. with a MD stretch ratio 4 times. The test results for shrinkage are summarized in Table II.

EXAMPLE XI

The PETG polyester pellets prepared in Example I were melt blended with 4% glyceryl monostearate and extruded into sheet then stretched into film at 85° C. with a MD stretch ratio 4 times. The test results for shrinkage are summarized in Table II.

TABLE II

| EXAMPLE | VI | VII | VIII | IX | X | XI |
|---|---|---|---|---|---|---|
| Stretch Temp, °C. | 90 | 90 | 90 | 90 | 85 | 85 |
| Stretch Ratio | 3 | 4 | 4 | 4 | 4 | 4 |
| Shrinkage at 60° C., % | 2 | 0 | 2 | 3 | 12 | 14 |
| Shrinkage at 70° C., % | 26 | 22 | 31 | 38 | 48 | 45 |
| Shrinkage at 80° C., % | 51 | 59 | 62 | 57 | 68 | 69 |
| Shrinkage at 90° C., % | 58 | 74 | 73 | 70 | 74 | 74 |
| On Set Shrink Temp. °C. | 60 | 64 | 60 | 59 | 56 | 54 |

The results in Table II clearly show that on-set shrink temperature is reduced by modification with a plasticizer. In addition, the data indicates that PETG is inferior to PVC since PETG has a higher on-set shrink temperature.

The polyester/2% plasticizer blend has 3% shrinkage at 60° C. as compared to 0% for straight PETG. Therefore, the on-set shrink temperature of plasticized PETG with 2% glyceryl monostearate is identical to that of PVC even though its maximum shrink rate is still higher than that of PVC.

The polyester/3% plasticizer blend has an on-set shrink temperature of about 56° C. It has 12% shrinkage at 60° C. It has lower on-set shrink temperature so that it can be used in even lower temperature shrink packaging. This plasticized version of PETG has even better shrinkage characteristics compared to straight PETG 6763.

The polyester/4% plasticizer blend has an on-set shrink temperature of about 54° C. which is suitable for very heat sensitive shrink packaging.

The polyester/plasticizer blends of the present invention produce heat-shrinkable films which are environmentally safe and do not have the disadvantages of higher on-set shrink temperature and higher shrink rate associated with the previous heat shrinkable films. The heat-shrinkable films of the present invention exhibit resistance to heat, printability, impact resistance, and stress crack resistance, and display excellent melt flowability at the time of extrusion.

The invention has been described in detail with particular reference to preferred embodiments and methods thereof, but it will be understood that variations and modifications can be effected within the spirit and scope of the invention.

What is claimed is:

1. A heat-shrinkable film or sheet comprising a blend of:
   (A) 90 to 99 weight percent of a polyester having a glass transition temperature of 40° C. to 150° C. and an inherent viscosity of 0.5 to 1.2 dL/g, comprising
      (1) a dicarboxylic acid component comprising repeat units from at least 80 mole percent of an aromatic dicarboxylic acid having 8 to 14 carbon atoms, and
      (2) a diol component comprising repeat units from at least 10 mole percent of 1,4-cyclohexanedimethanol, based on 100 mole percent dicarboxylic acid and 100 mole percent diol; and
   (B) 1 to 10 weight percent of a plasticizer selected from a $C_5$ to $C_{35}$ monoglyceride prepared from the reaction of glycerol and a fatty acid having 4 to 30 carbon atoms, wherein the combined weights of (A) and (B) total 100 percent.

2. The heat-shrinkable film or sheet of claim 1 wherein the dicarboxylic acid component of the polyester consists essentially of repeat units from terephthalic acid.

3. The heat-shrinkable film or sheet of claim 1 wherein the diol component of the polyester consists essentially of repeat units from 67 to 75 mole percent of ethylene glycol and 33 to 25 mole percent of 1,4-cyclohexanedimethanol.

4. The heat-shrinkable film or sheet of claim 1 wherein the polyester, component (A), has an inherent viscosity of 0.6 to 0.9 dL/g.

5. The heat-shrinkable film or sheet of claim 1 wherein the polyester, component (A), has a glass transition temperature of 50° C. to 100° C.

6. The heat-shrinkable film or sheet of claim 1 wherein the plasticizer is present in an amount of 2 to 6 weight percent based on the weight of components (A) and (B).

7. The heat-shrinkable film or sheet of claim 1 wherein the fatty acid is selected from the group consisting of isovaleric acid, valeric acid, caproic acid, enanthic acid, caprylic acid, pelargonic acid, capric acid, lauric acid, tridecylic acid, myristic acid, pentadecyclic acid, palmitic acid, margaric acid, stearic acid, arachidic acid, phytanic acid, behenic acic, lignoceric acid, cerotic acid, montanic acid, caproleic acid, palmitoleic acid, oleic acid, vaccenic acid, elaidic acid, brassidic acid, erucic acid, nervonic acid, linoleic acid, eleosteric acid, linolenic acid and arachidonic acid.

8. The heat-shrinkable film or sheet of claim 1 wherein the plasticizer is glyceryl monostearate.

9. A process for preparing a heat-shrinkable film or sheet comprising:
   (I) mixing at a temperature of 200° C. to 315° C.
      (A) 90 to 99 weight percent of a polyester having a glass transition temperature of 40° C. to 150° C. and an inherent viscosity of 0.5 to 1.2 dL/g, comprising
         (1) a dicarboxylic acid component comprising repeat units from at least 80 mole percent of an aromatic dicarboxylic acid having 8 to 14 carbon atoms, and
         (2) a diol component comprising repeat units from at least 10 mole percent of 1,4-cyclohexanedimethanol, based on 100 mole percent dicarboxylic acid and 100 mole percent diol; and
      (B) 1 to 10 weight percent of a plasticizer selected from a $C_5$ to $C_{35}$ monoglyceride prepared from the reaction of glycerol and a fatty acid having 4 to 30 carbon atoms, wherein the combined weights of (A) and (B) total 100 percent; and
   (II) forming the blend into a film or a sheet.

10. The process of claim 9 wherein the plasticizer is glyceryl monostearate.

11. A polyester/plasticizer concentrate which is used to prepare a heat-shrinkable film or sheet comprising:
   (A) 88 to 94 weight percent of a polyester having a glass transition temperature of 40° C. to 150° C. and an inherent viscosity of 0.5 to 1.2 dL/g, comprising
      (1) a dicarboxylic acid component comprising repeat units from at least 80 mole percent of an aromatic dicarboxylic acid having 8 to 14 carbon atoms, and
      (2) a diol component comprising repeat units from at least 10 mole percent of 1,4-cyclohexanedimethanol, based on 100 mole percent dicarboxylic acid and 100 mole percent diol; and
   (B) 6 to 12 weight percent of a plasticizer selected from a $C_5$ to $C_{35}$ monoglyceride prepared from the reaction of glycerol and a fatty acid having 4 to 30 carbon atoms, wherein the combined weights of (A) and (B) total 100 percent.

12. The polyester/plasticizer concentrate of claim 11 wherein the plasticizer is glyceryl monostearate.

* * * * *